United States Patent
Carrico

(10) Patent No.: US 7,148,816 B1
(45) Date of Patent: Dec. 12, 2006

(54) AIRCRAFT TRAFFIC SOURCE SELECTION AND DISPLAY SYSTEM AND METHOD

(75) Inventor: Matthew J. Carrico, Mount Vernon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 185 days.

(21) Appl. No.: 10/929,250

(22) Filed: Aug. 30, 2004

(51) Int. Cl.
G08G 5/04 (2006.01)

(52) U.S. Cl. ............... 340/961; 340/971; 701/14

(58) Field of Classification Search ......... 340/961
See application file for complete search history.

(56) References Cited

U.S. PATENT DOCUMENTS

| | | | |
|---|---|---|---|
| 6,339,747 B1 * | 1/2002 | Daly et al. | 702/3 |
| 6,459,411 B1 * | 10/2002 | Frazier et al. | 340/961 |
| 6,574,555 B1 * | 6/2003 | Mochizuki et al. | 701/211 |
| 6,657,578 B1 | 12/2003 | Stayton et al. | 342/30 |
| 6,683,562 B1 * | 1/2004 | Stayton et al. | 340/961 |
| 6,826,458 B1 * | 11/2004 | Horvath et al. | 340/963 |
| 6,957,128 B1 * | 10/2005 | Ito et al. | 340/870.16 |
| 2006/0004579 A1 * | 1/2006 | Claudatos et al. | 704/270 |

* cited by examiner

*Primary Examiner*—Daniel Wu
*Assistant Examiner*—Eric M. Blount
(74) *Attorney, Agent, or Firm*—Nathan O. Jensen; Kyle Eppele

(57) ABSTRACT

A method of displaying traffic information is disclosed. The method comprises providing traffic information from at least one of a first and a second traffic information system to a traffic display system. The method also comprises choosing to display, by the traffic display system, traffic information from the first traffic information system when no traffic information from the second traffic information system is available. Further, the method comprises choosing to display, by the traffic display system, traffic information from the second traffic information system when no traffic information from the first traffic information system is available. The method further comprises choosing to display, by the traffic display system, traffic information from either the first traffic information system or the second traffic information system using a predetermined selection algorithm when traffic information is available from both traffic information systems. Further still, the method comprises choosing to display, by the traffic display system, traffic information from the first traffic information system when an advisory condition is indicated by the first traffic information system.

24 Claims, 3 Drawing Sheets

AIRCRAFT TRAFFIC SOURCE SELECTION AND DISPLAY SYSTEM AND METHOD

BACKGROUND

Conventionally, avionics engineers and certification bodies are improving and providing pilots and flight crews with information necessary to identify in-flight traffic. An approach has been to provide the flight crew with information on the location of other aircraft in the area. One exemplary system, which is capable of providing this information, is known as traffic alert and collision avoidance system (TCAS). The systems are required for all airliners flying in the United States air space today. TCAS devices have been designed to interrogate transponders of other aircrafts, sometimes referred to as intruder aircraft. A TCAS system evaluates the threat of a collision with other aircraft and coordinates an avoidance maneuver for the aircraft. Further, the TCAS system provides traffic advisories (TAs) and resolution advisories (RAs). TAs are situations where the TCAS system identifies that there is traffic in the area which may become a threat to the aircraft in a short period of time. An RA is presented to an aircraft crew when there is imminent threat to the aircraft of a collision. The RA provides information to the pilot on actions the pilot should take to avoid the collision.

More recently, another type of traffic information system has been developed, known as automatic dependent surveillance broadcast (ADS-B). ADS-B systems are capable of providing position, velocity, and status information broadcast from an aircraft at regular intervals using information obtained from global positioning system (GPS) satellites and onboard systems. ADS-B systems may use a mode S transponder, or other transponder, and provide transmissions at regular intervals. Accordingly, ADS-B transponders need not be interrogated by another aircraft.

In an ADS-B system, a mode S transponder or a squitter may be disposed in a first aircraft that periodically emits a squitter message. The squitter message is a radio frequency (RF) signal that is generated by the radio-based transponder.

Further, another type of traffic information system is a traffic information services broadcast (TIS-B) system. A TIS-B system is typically a ground station which provides position, velocity, and status information of air and ground vehicles using information obtained from ADS-B, primary surveillance radar, secondary surveillance radar, and other systems. The TIS-B ground station provides a squitter message on a periodic basis similar to the squitter message in the ADS-B system. Accordingly, ADS-B tends to refer to the air-to-air link and TIS-B tends to refer to the ground-to-air link. Each of the systems provide a data link to another aircraft. A further source of traffic information may be provided from air traffic control via looking out the window, or through a ground based or other radar system. Such information can then be communicated by the air traffic controllers to any aircraft within the vicinity of the airport.

With a variety of systems providing information to an aircraft crew, there is need for a system which provides a simplistic display to the aircraft crew. Further, there is a need for a system which chooses which information source to present to the aircraft crew in the case that there may be redundant information provided to the display system itself. Further, there is a need for a system in which specialized icons may aid in presenting information to the aircraft crew.

It would be desirable to provide a system and/or method that provides one or more of these or other advantages features. Other features and advantages will be made apparent from the present specification. The teachings disclosed extend to those embodiments which fall within the scope of the appended claims, regardless of whether they accomplish one or more of the aforementioned needs.

SUMMARY

What is provided is a method of displaying traffic information. The method comprises providing traffic information from at least one of a first and a second traffic information system to a traffic display system. The method also comprises choosing to display, by the traffic display system, traffic information from either the first traffic information system or the second traffic information system using a predetermined selection algorithm when traffic information is available from both traffic information systems.

What is also provided is a traffic information display system. The traffic information display system comprises a first traffic information system and a second traffic information system. What is also provided is a processor coupled to the first and second traffic information systems. Further, the traffic information display system comprises a display coupled to the processor to display traffic information. Further still, the traffic information display system comprises a program running on the processor that chooses to display traffic information from the first traffic information system when no traffic information from the second traffic information system is available. The program also chooses to display the traffic information from the second traffic information system when no traffic information from the first traffic information system is available. Further still, the program chooses to display traffic information from the first traffic information system when an advisory condition is indicated by the first traffic information system.

Further, what is provided is a system for displaying traffic information. The system comprises a means for providing traffic information from at least one of a first and a second traffic information system to a traffic display system. The system also comprises a means for choosing to display, by the traffic display system, traffic information from the first traffic information system when no traffic information from the second traffic information system is available. Further, the system comprises a means for choosing to display, by the traffic display system, traffic information from the second traffic information system when no traffic information from the first traffic information system is available. Further still, the system comprises a means for choosing to display, by the traffic display system, traffic information from the first traffic information system when an advisory condition is indicated by the first traffic information system.

Alternative examples and other exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Figure 1:
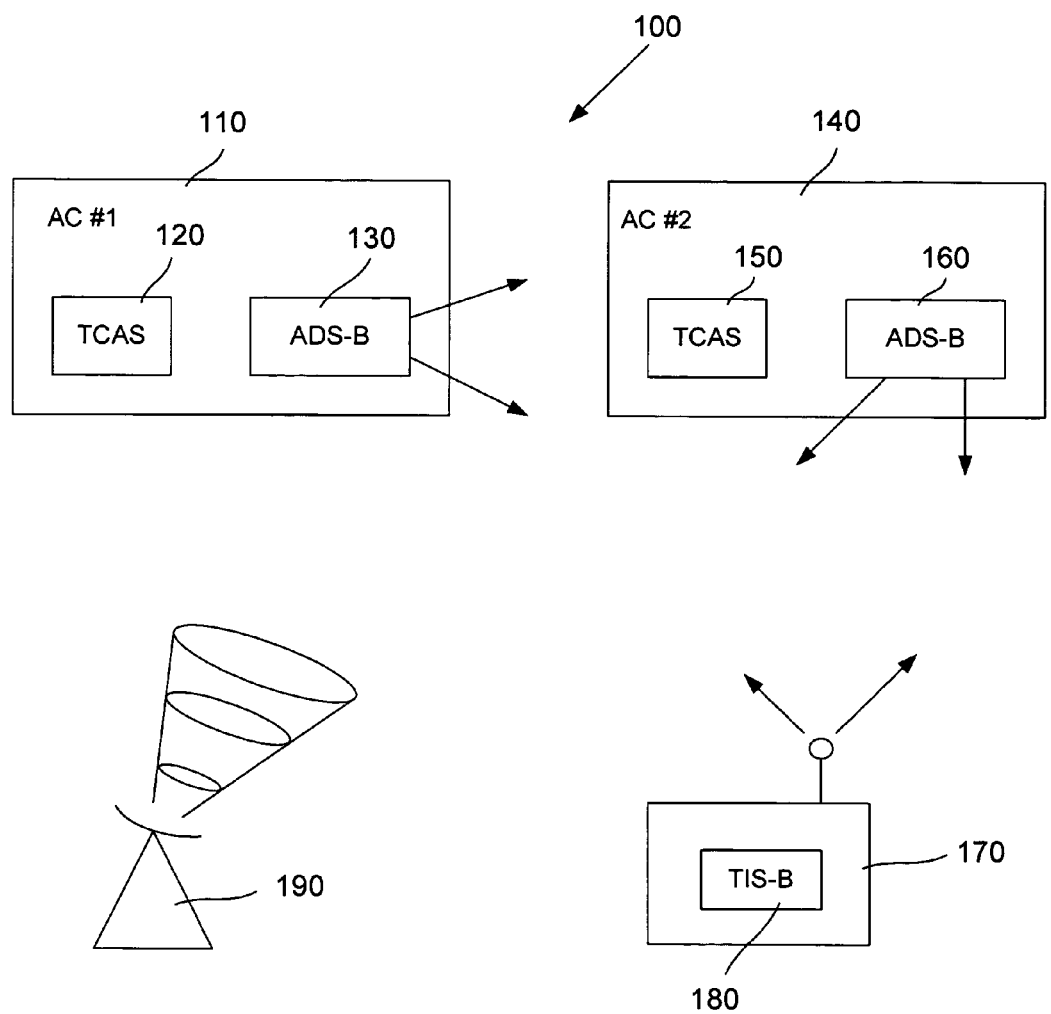
FIG. 1 is an exemplary block diagram of a aircraft environment with aircraft having multiple traffic information sources.

Before describing in detail the particular improved system and method, it should be observed that the invention includes, but is not limited to a novel structural combination of conventional data/signal processing elements and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with the structural details which will be readily apparent to those skilled in the art, having the benefit of the description herein. Further, the invention is not limited to the particular embodiments depicted in the exemplary diagrams, but should be construed in accordance with the language in the claims.

Referring now to FIG. 1, an aircraft system 100 is depicted. Aircraft system 100 may comprise multiple aircrafts for example, aircraft AC #1 or 110 and aircraft AC #2 or 140. Aircrafts 110 and 140 may be any of a variety of aircrafts including but not limited to airplanes and helicopters. Aircrafts 110 and 140 may have onboard TCAS systems 120 and 150, respectively, as well as ADS-B systems 130 and 160, respectively. Each of the systems may have their own separate transponder, or may share a transponder. The TCAS system interrogates other aircraft which may be in the nearby air space. The ADS-B systems 130 and 160 broadcast information relating to the identification, position, and velocity, among other information about the aircraft. Systems 130 and 160 are interconnected with other systems on board the aircraft. Further, systems 120, 130, 150 and 160 may all be coupled to a processor, and/or may also be coupled to other onboard systems which are for alerting, command, and control. Further, ADS-B systems 130 and 160 also receive and process the ADS-B and TIS-B messages from other aircraft and ground stations.

System 100 may also comprise ground information systems including, but not limited to a ground station 170 having a TIS-B system which broadcasts information about the current position, velocity, and identification, among other information of air and ground vehicles in the proximate region. The TIS-B broadcast are conventionally on a periodic schedule, for example broadcast regularly at 1 hertz. Similarly, ADS-B signals may also be broadcast on any of a variety of schedules, including a regular periodic schedule of 1 Hertz and aperiodic messages broadcast upon the occurrence of specific events. System 100 may also include a ground-based radar 190 which provides information to air traffic control, air traffic control information being communicated to the aircrafts via voice data links or alternatively other data links.

In a typical ADS-B and/or TIS-B system, the data broadcast may be the position, velocity, and a number of other parameters of the aircraft. For example, current position, current velocity, current altitude, type of airplane, flight identification, flight plan, and expected change in trajectory, may all be provided. Conventionally, the broadcast are periodically performed on a 1 hertz schedule.

In the exemplary embodiment depicted in FIG. 1, both TCAS data and data link data (e.g., ADS-B and TIS-B) may be available on a single target. Accordingly, it would be desirable to have an algorithm which decides which information should be used when displaying the information to the aircraft crew. It may be undesirable to have the aircraft crew receive redundant information which may not be precisely redundant but may have some error associated with one or more of the information sources. Accordingly, a method and system which makes a decision as to what information to display is desirable for simplifying the pilot or aircraft crew's tasks. Referring to Table 1 below, Table 1 depicts a decision matrix or algorithm which makes such a display decision. The first column depicts whether data link information is available, the second column depicts whether TCAS information is available and the third column depicts what information source to display.

Looking at the first row, there is no data link information available. There is TCAS information available so the TCAS information is used to provide the position of the target on the flight display. Referring to the second row, data link information is available, there is no TCAS information available, therefore data link information is used to provide the position of the target on the flight display. In the third row, data link information is available as well as TCAS information. In this case, the TCAS information will be used to provide the display if an advisory condition exists (e.g., RA or TA), otherwise the source of what is thought to be the best positional accuracy is chosen. In a situation where there is a traffic advisory, that is, there are aircraft targets which appear to be a potential hazard, a traffic advisory is issued. In this case, the position indicated by the TCAS system is used. Similarly, when there is a resolution advisory, that is, collision with another aircraft is imminent unless an evasive maneuver is made, TCAS again provides an indication of the position on the display. If no advisory condition is indicated by the TCAS system, then the system with the assumed best positional accuracy is used.

TABLE 1

Target Position Data Availability

| Data Link | TCAS | Target Display Position Source |
| --- | --- | --- |
| No | Yes | TCAS |
| Yes | No | Data Link |
| Yes | Yes | TCAS if RA or TA active, otherwise choose the source with the best positional accuracy. |

Typically, the direct link ADS-B message will have the best positional accuracy, but this depends on the target's navigation system accuracy and other quality factors. The positional accuracy of a TIS-B uplinked message depends on the ground surveillance method used to obtain the target position and the total system latency of the uplink message. Some TIS-B systems use one of two levels of precision in reporting position, for example "Coarse" position may be reported which is derived from ground radar with an approximate update rate of once per 5 seconds. There also may be "Fine" position reports which are derived from multi-lateration with an update rate of once per second. "Coarse" position reports would be expected to be less accurate than TCAS active surveillance data, while "Fine" position reports should be more accurate than TCAS. Further, it may be possible to correlate the flight ID (as obtained from the ADS-B/TIS-B data link) with the TCAS active surveillance target. In this case, the flight ID may be displayed next to the TCAS position signal, even though the ADS-B position data is not being used for the target position display.

Figure 2:
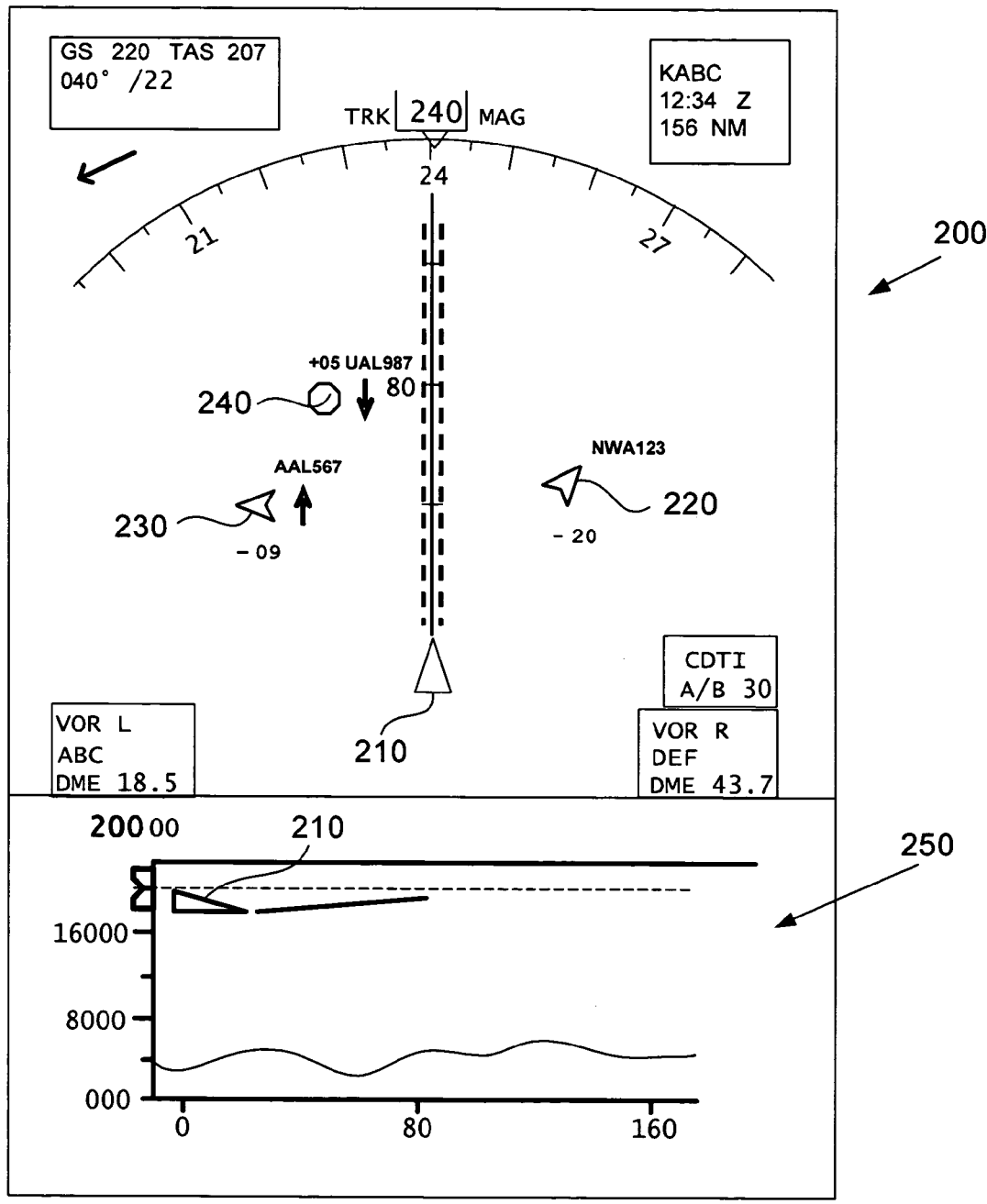
FIG. 2 is an exemplary embodiment of a traffic information display on board an aircraft.

Further, it would be desirable if the traffic situation display would also indicate the information source of each displayed target. One method of doing this is utilizing different symbology (icons) for each of the different sources. For example, referring now to FIG. 2, flight display 200 is depicted. Flight display 200 depicts an aircraft 210 in the vicinity of other aircrafts 220, 230 and 240. Aircrafts 220 and 230, are white chevron-shaped icons which indicate that they are airborne traffic flying in the direction at which they are pointed, the aircraft source information being provided over a data link service. Further, it can be seen that flight identification is associated with each icon for example "AAL567" for aircraft 230 and "NWA123" for aircraft 220. The symbol used for aircraft 240 is not a directional symbol, which means that directionality information was not available. The symbol for aircraft 240 indicates that the information is from ADS-B/TIS-B and has a loss of directionality. Further, flight display 200 may include a variety of other information, including, but not limited to a vertical flight display 250, showing both terrain and any traffic threats within the current trajectory or the flight plan of aircraft 210.

Figure 3:
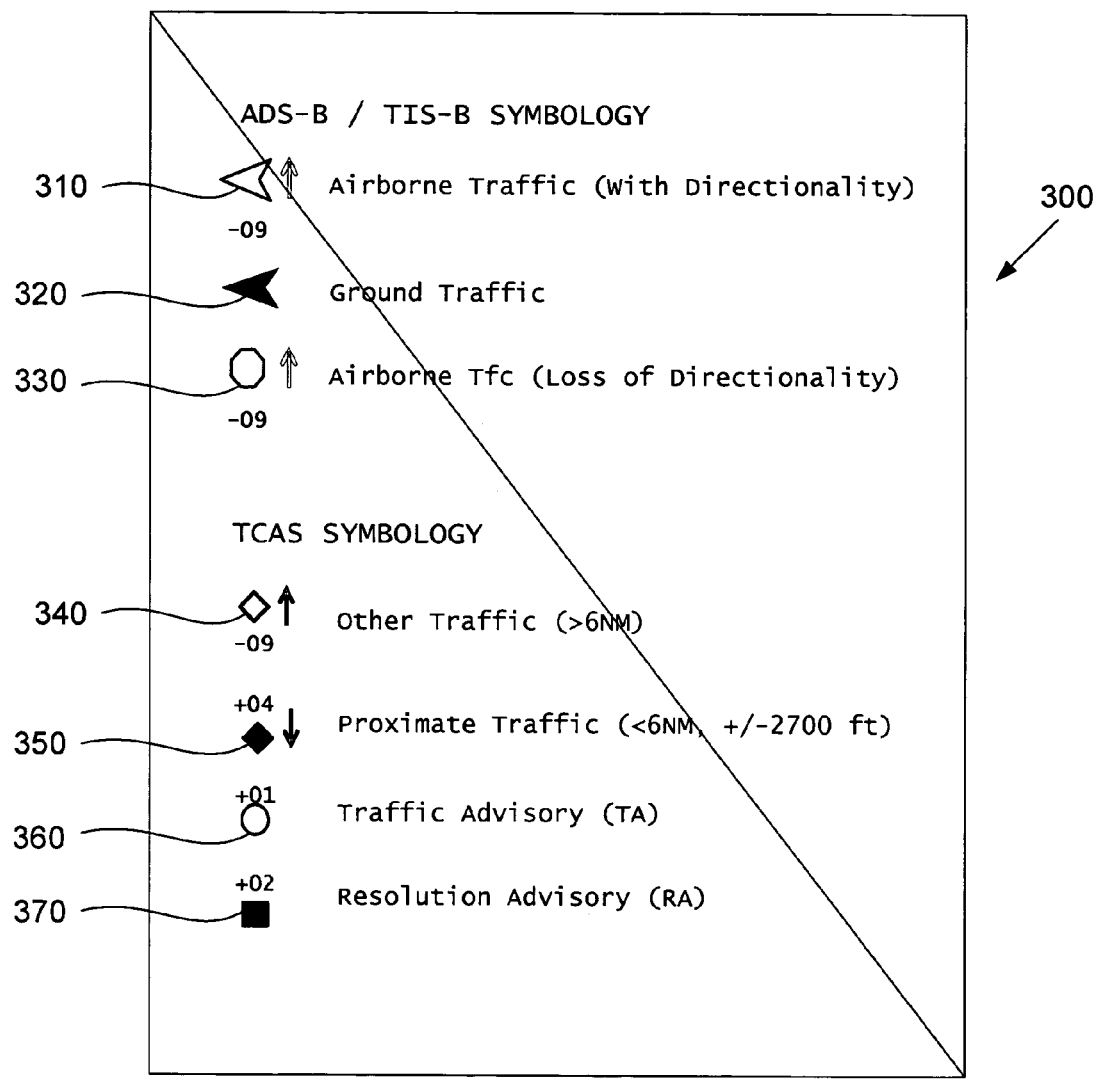
FIG. 3 is an exemplary legend of symbols which may be used in a traffic information system in which there are multiple traffic information sources.

Referring now to FIG. 3, a legend 300 depicts the iconal or representations of the air traffic or the symbology used on the flight display. Legend 300 includes, a white chevron 310 which indicates that the traffic is airborne traffic with directionality and the source is ADS-B/TIS-B. The filled chevron 320 indicates that it is ground traffic with directionality. The source for the ground traffic is ADS-B/TIS-B. White octagon 330 indicates that there is airborne traffic which has a loss of directionality. However, the information source is ADS-B/TIS-B.

A white diamond 340 indicates that there is other traffic and this traffic is greater than 6 nautical miles from the aircraft. The information source is TCAS. A filled diamond 350 indicates that there is proximate traffic that is less than 6 nautical miles (plus or minus 2700 feet). The information source is TCAS. A white circle 360 indicates that there is a traffic advisory in effect. A resolution advisory is indicated by a filled square 370. The information is TCAS. It should be recognized that the symbology provided here should not be seen as limited, to those shown. Other types and shapes of icons may be used without departing from the scope of the invention. Other shapes which depict directionality may also be used in place of the chevrons.

In an exemplary embodiment, the method would use standard TCAS symbology when TCAS is the display position source and a readily distinguishable symbol (such as the chevron) when the data link is the display position source.

The white chevron is one shape which may be used to indicate ADS-B/TIS-B traffic. The direction of the chevron indicates the current target heading, as determined by the heading data in the data link message. Other attributes of the chevron may be used to indicate traffic status, such as using brown fill to indicate on-ground status. Other symbol shapes, distinct from TCAS, may be used to differentiate aircraft from service vehicles. A non-directional symbol shape may be needed when heading information is not available from the target.

While the detailed drawings, specific examples, and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing and communication devices. For example, the type of computing and communications devices, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of displaying traffic information, comprising:
providing traffic information from at least one of a first and a second traffic information system to a traffic display system; and
choosing to display, by the traffic display system, traffic information from either the first traffic information system or the second traffic information system using a predetermined selection algorithm when traffic information is available from both traffic information systems.

2. The method of claim 1, wherein the first traffic information system is a traffic alert and collision avoidance system (TCAS).

3. The method of claim 1, wherein the second traffic information system comprises an automatic dependent surveillance broadcast (ADS-B) system.

4. The method of claim 1, wherein the second traffic information system comprises a traffic information surveillance broadcast (TIS-B) system.

5. The method of claim 1, further comprising:
displaying an icon representative of a vehicle from a first set of icons when the first traffic information is displayed.

6. The method of claim 5, further comprising:
displaying an icon representative of a vehicle from a second set of icons when the second traffic information is displayed.

7. The method of claim 6, wherein at least some of the icons from the second set of icons indicate directional information by their shape and orientation.

8. The method of claim 7, wherein the second set of icons includes at least one chevron shaped icon.

9. A traffic information display system, comprising:
a first traffic information system;
a second traffic information system;
a processor coupled to the first and second traffic information systems;
a display coupled to the processor to display traffic information; and
a program running on the processor that chooses to display traffic information from the first traffic information system when no traffic information from the second traffic information system is available, chooses to display traffic information from the second traffic information system when no traffic information from the first traffic information system is available, and chooses to display traffic information from the first traffic information system when an advisory condition is indicated by the first traffic information system.

10. The system of claim 9, wherein the first traffic information system is a traffic alert and collision avoidance system (TCAS).

11. The system of claim 9, wherein the second traffic information system comprises an automatic dependent surveillance broadcast (ADS-B) system.

12. The system of claim 9, wherein the second traffic information system comprises a traffic information surveillance broadcast (TIS-B) system.

13. The system of claim 9, further comprising:
an icon representative of a vehicle chosen from a first set of icons when the first traffic information is displayed.

14. The system of claim 13, further comprising:
an icon representative of a vehicle chosen from a second set of icons when the second traffic information is displayed.

15. The system of claim 14, wherein at least some of the icons from the second set of icons indicate directional information by their shape and orientation.

16. The system of claim 15, wherein the second set of icons includes at least one chevron shaped icon.

17. A system for displaying traffic information comprising:
a means for providing traffic information from at least one of a first and a second traffic information system to a traffic display system;
a means for choosing to display, by the traffic display system, traffic information from the first traffic information system when no traffic information from the second traffic information system is available;
a means for choosing to display, by the traffic display system, traffic information from the second traffic information system when no traffic information from the first traffic information system is available; and
a means for choosing to display, by the traffic display system, traffic information from the first traffic information system when an advisory condition is indicated by the first traffic information system.

18. The system of claim 17, wherein the first traffic information system is a traffic alert and collision avoidance system (TCAS).

19. The system of claim 17, wherein the second traffic information system comprises an automatic dependent surveillance broadcast (ADS-B) system.

20. The system of claim 17, wherein the second traffic information system comprises a traffic information surveillance broadcast (TIS-B) system.

21. The system of claim 17, further comprising:
a means for displaying an icon representative of a vehicle from a first set of icons when the first traffic information is displayed.

22. The system of claim 21, further comprising:
a means for displaying an icon representative of a vehicle from a second set of icons when the second traffic information is displayed.

23. The system of claim 22, wherein at least some of the icons from the second set of icons indicate directional information by their shape and orientation.

24. The system of claim 23, wherein the second set of icons includes at least one chevron shaped icon.

* * * * *